(12) United States Patent
Fitzgerald

(10) Patent No.: US 10,199,807 B2
(45) Date of Patent: Feb. 5, 2019

(54) CONVEYANCE MEMBER REMOVAL METHOD AND DEVICE

(71) Applicant: JSM Construction Limited, Hertfordshire (GB)

(72) Inventor: John Fitzgerald, Hertfordshire (GB)

(73) Assignee: JSM Construction Limited (GB)

( * ) Notice: Subject to any disclaimer, the term of this patent is extended or adjusted under 35 U.S.C. 154(b) by 0 days.

(21) Appl. No.: 15/537,463

(22) PCT Filed: Dec. 18, 2015

(86) PCT No.: PCT/GB2015/054094
§ 371 (c)(1),
(2) Date: Jun. 19, 2017

(87) PCT Pub. No.: WO2016/097770
PCT Pub. Date: Jun. 23, 2016

(65) Prior Publication Data
US 2018/0006438 A1 Jan. 4, 2018

(30) Foreign Application Priority Data
Dec. 19, 2014 (GB) .................................. 1422723.5

(51) Int. Cl.
*H02G 1/06* (2006.01)
*H02G 1/08* (2006.01)

(52) U.S. Cl.
CPC ............... *H02G 1/06* (2013.01); *H02G 1/086* (2013.01); *H02G 1/088* (2013.01)

(58) Field of Classification Search
CPC .................................. H01G 1/06; F16L 1/024
See application file for complete search history.

(56) References Cited

U.S. PATENT DOCUMENTS 3,805,899 A * 4/1974 Hicks ...................... E21B 7/046
173/45
4,403,667 A 9/1983 Reichman et al.
(Continued)

FOREIGN PATENT DOCUMENTS

DE 19504484 C1 9/1996
DE 19802691 C1 2/2000
(Continued)

OTHER PUBLICATIONS

International Search Report and Written Opinion, PCT/GB2015/054094, dated Apr. 5, 2016.
(Continued)

*Primary Examiner* — Benjamin F Fiorello
(74) *Attorney, Agent, or Firm* — Craig A. Fieschko, Esq.; DeWitt Ross & Stevens S.C.

(57) ABSTRACT

A device for use in removing a conveyance member from a material includes a displacement element (12, 1012) and a self-propelling driving element. The displacement element (12, 1012) is for being placed at least partly around a conveyance member (16) and for displacing material as the displacement element (12, 1012) is advanced along a conveyance member (16). The driving element is coupled to and movable with the displacement element (12, 1012) to advance the displacement element along a conveyance member (16).

13 Claims, 7 Drawing Sheets

(56) References Cited

U.S. PATENT DOCUMENTS

| | | | |
|---|---|---|---|
| 4,422,800 A * | 12/1983 | Parish | E21B 7/046 |
| | | | 116/DIG. 14 |
| 5,096,000 A | 3/1992 | Hesse | |
| 5,096,002 A | 3/1992 | Cherrington | |
| 5,136,969 A | 8/1992 | Chapman | |
| 5,351,764 A | 10/1994 | Cherrington | |
| 5,403,122 A | 4/1995 | Granella | |
| 5,741,088 A * | 4/1998 | Kleyman | E02F 5/003 |
| | | | 405/174 |
| 6,244,783 B1 | 6/2001 | Puttmann et al. | |
| 7,963,723 B2 | 6/2011 | Wurm et al. | |
| 9,859,693 B2 * | 1/2018 | Fitzgerald | H02G 1/00 |
| 2004/0067108 A1 | 4/2004 | Bayer | |
| 2007/0023205 A1 | 2/2007 | Wurm | |

FOREIGN PATENT DOCUMENTS

| | | |
|---|---|---|
| EP | 0 353 442 A2 | 2/1990 |
| EP | 0 468 664 A2 | 1/1992 |
| GB | 2 103 888 A | 2/1983 |
| GB | 2 386 767 A | 9/2003 |
| GB | 2 426 534 A | 11/2006 |
| GB | 2 431 424 A | 4/2007 |
| GB | 2 466 897 A | 7/2010 |

OTHER PUBLICATIONS

International Search Report and Written Opinion, PCT/GB2015/051343, dated Sep. 23, 2015.

UK Patent Office Search Report, GB1422723.5, dated Jun. 11, 2015.

UK Patent Office Search Report, GB1408164.0, dated Oct. 29, 2014.

Energy Networks Association, Feb. 27, 2014, "Cable Extraction", Smarternetworks.org [online], Available from: http://www.smarternetworks.org/Files/Cable_Extraction_140227122330.pdf.

* cited by examiner

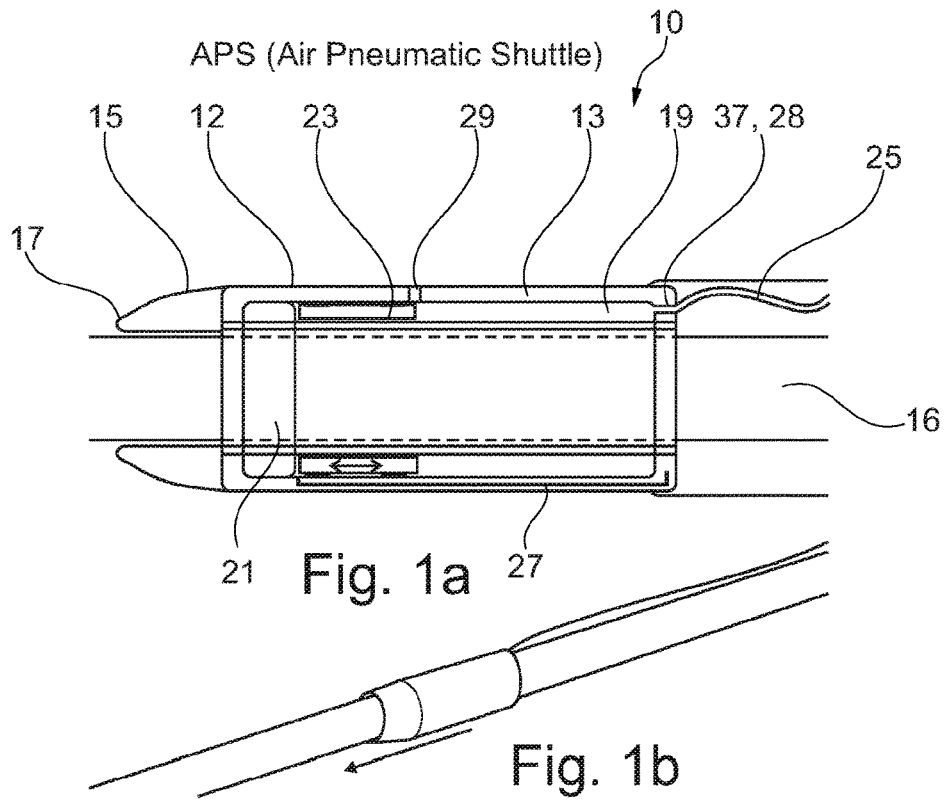
APS (Air Pneumatic Shuttle)
Fig. 1a
Fig. 1b
Air operated percussion cable debonder for 132kV and below (with wash out function)
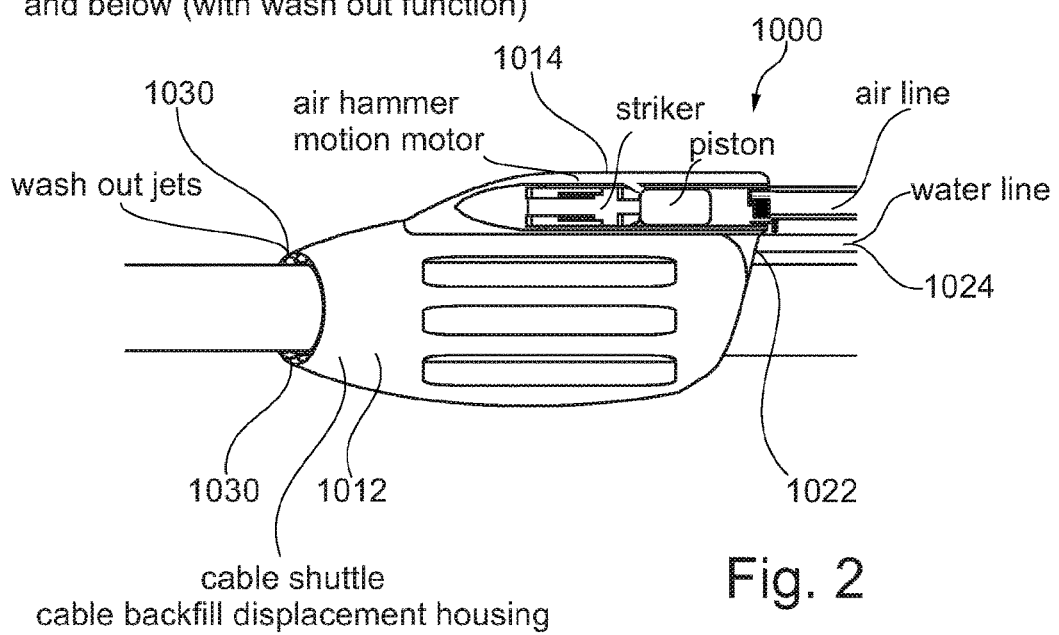
Fig. 2

CONVEYANCE MEMBER REMOVAL METHOD AND DEVICE

TECHNICAL FIELD

The present invention relates to methods for removing conveyance members and devices for use in removing conveyance members.

BACKGROUND

In the United Kingdom and around the world, significant lengths of electrical cable are underground, especially in built-up areas where it is difficult or undesirable to suspend cables from pylons.

In many cases, since these cables were laid, further building has been done above the cables.

At present, in order to remove such cables, it is generally necessary to dig them out. However, this is often extremely difficult, for example where extensive building has been carried out above them and/or where the owner of the land does not wish his land to be disturbed. For example, if the cables pass under farmland, it is often necessary initially to remove and store the topsoil. Then it is necessary to dig out the cable. Once the cable has been dug out, it is necessary to import earth to fill the void left by the removed cable, before replacing the topsoil. Throughout this procedure, the farmer is unable to use his land.

As a result of these difficulties, it is often easier to leave redundant cables where they are.

However, many underground electricity cables include oil under pressure to prevent the high-voltage conductive core becoming inadvertently grounded. This can be an environmental risk since the oil can be environmentally damaging if it leaks. Furthermore, the risk of such leaks is higher with redundant cables since they are generally older and potentially degraded in comparison with newer cables.

One way in which this risk is addressed is by soldering caps onto the ends of sections of redundant cables to prevent leakage of oil. However, this is a costly process and needs to be carried out by an expert jointer.

SUMMARY OF THE INVENTION

Aspects of the present invention seek to provide an improved conveyance member removal method and device.

According to an aspect of the invention, there is provided a device for use in removing a conveyance member from a material, including:
  a displacement element for being placed at least partly around a conveyance member and for displacing material as the displacement element is advanced along a conveyance member; and
  a self-propelling driving element coupled to and movable with the displacement element to advance the displacement element along a conveyance member.

According to an aspect of the invention, there is provided a device for use in removing a conveyance member from a material, including:
  a displacement element for being placed at least partly around a conveyance member and for displacing material as the displacement element is advanced along a conveyance member; and
  a percussive driving element coupled to the displacement element for performing a percussive action to advance the displacement element along a conveyance member.

The term 'ahead' is intended to mean ahead in a direction along which the device is primarily designed to be advanced and the terms 'forwards', 'front' and 'back' are similarly intended to be with respect to the direction in which the device is primarily designed to be advanced.

The term 'conveyance member' is intended to refer to for example elongate and/or tubular members or lines for conveying substances or signals, such as water, gas, electricity, or fibre optic signals, in particular underground. These can be for example wires, ducts or pipes, for example metal and/or plastic pipes. Preferably, the conveyance member is a cable, preferably an electricity cable. Nevertheless, although the term 'cable' is used throughout this description, embodiments can be used with other conveyance members or conveyance lines.

Percussive actions described herein refer to repetitive percussive actions.

Preferred embodiments of the invention are able to loosen a cable in material, such as in the ground, sufficiently that it can be pulled or pushed in a longitudinal direction to slide out and be removed from the material. The device can be said to form a void around the cable or debond the cable from the material. This can mean that it is only necessary to excavate a small section of the cable, either an end or a section in which the cable can be cut to create an end, and the cable can be slid out from under the ground. This means that it is not necessary to dig a trench as long as the section of cable it is desired to remove, thereby saving significant time and expense.

Some previous attempts to remove cables in a longitudinal manner have resulted in the cable snapping, meaning that in order to recover the entire cable, it has been necessary to dig a long trench in the conventional manner. Furthermore, a snapping cable can lead to environmental risks if there is still oil in the cable. However, by providing a device which can travel along the cable and loosen the cable, the risk of the friction being greater than a breaking strength of the cable is minimised. The displacement element can displace material away from the cable, compacting it outside the circumference of the displacement element. This can create a void between the material and the cable, decreasing the resistance to the removal of the cable.

In embodiments, the driving element is movable with the displacement element, for example the driving element and displacement element can be configured to advance as a single unit.

The driving element is preferably a hammer-action driving element.

The driving element is preferably reversible, that is to say that the driving element can be operable selectively to advance or reverse the displacement element. This can be particularly advantageous, for example if the device hits an old repair joint that has not been accurately logged. Instead of needing to excavate the device, the device can be reversed so that it can try again to get past, so that a larger device can be used, or so the procedure can be aborted easily.

Preferably, the displacement element is configured for substantially surrounding a conveyance member. Preferably, the displacement element or at least an inner edge thereof is substantially annular, preferably substantially circular in cross section. In other words, the displacement element can include a passageway therethrough for receiving a conveyance member, the passageway preferably being substantially circular in cross section.

Preferably, the passageway has a diameter of at least 80 mm. The size of the passageway is preferably selected in view of the size of the conveyance member to be removed.

However, a passageway with a diameter of at least 80 mm is suitable for conveyance members with a diameter of at least 80 mm, and conveyance members of such size are better able to support a self-propelled device than smaller conveyance members, especially if the conveyance member is an electricity cable. Embodiments of the invention can therefore avoid damaging the conveyance member.

The device can be considered to have a longitudinal axis which coincides with a longitudinal axis of a conveyance member when the device is placed on a conveyance member.

Preferably, the driving element is pneumatic. However, in other embodiments, the driving element can use other techniques to provide a self-propelling or percussive action, for example it can be hydraulic and/or use an electric motor.

Preferably, the driving element includes a piston chamber with a piston and an anvil in the piston chamber, the anvil being fixed with respect to the displacement element, the driving element being configured to advance the piston within the piston chamber to strike the anvil to cause a percussive force to be transferred to the displacement element. The piston chamber in embodiments is fluid-tight for piston operating fluid whereby to enable piston operating fluid to be pressurised in the piston chamber to cause movement of the piston.

In some embodiments, the displacement element includes the piston chamber within it. In other words, the piston chamber is a chamber in the displacement element.

In some embodiments, the piston chamber, piston, anvil and/or displacement element, or at least an inner surface of the displacement element, can be configured to at least partly extend around a conveyance member, for example by being arcuate.

In some embodiments, the piston chamber, piston, anvil and/or displacement element are configured for substantially surrounding a conveyance member. In other words, they can be configured to be continuous around a conveyance member. The piston chamber, piston, anvil and/or displacement element can be hollow, that is to say include a passageway therethrough for receiving a conveyance member.

Preferably, the piston chamber is longer in the longitudinal direction than the piston to enable the piston to move longitudinally within the piston chamber. However, a transverse dimension of the piston is preferably substantially the same as a transverse dimension of the piston chamber for example so that piston operating fluid is substantially prevented from passing the piston in a longitudinal direction. In arcuate or annular piston chambers, the transverse dimension can be an angular or circumferential dimension.

Preferably, the piston chamber, the piston, and/or the anvil are annular that is to say hollow.

Preferably, the device contains a single piston.

Preferably, the driving element is provided within the displacement element.

In some embodiments, the piston divides the piston chamber into a first chamber and a second chamber, the driving element includes a fluid conduit coupling element for coupling to a supply of piston operating fluid, and the driving element includes a first conduit coupling the first chamber in fluid communication with the fluid conduit coupling element, and a second conduit coupling the second chamber in fluid communication with the fluid conduit coupling element.

The piston operating fluid is preferably air but can also be oil.

The supply of piston operating fluid is preferably operable to supply pressurised piston operating fluid.

In some embodiments, the device is configured so that the only component which can be attached to the device, which is configured to travel with the device, and which is configured not to entirely enter material, is a pressurised piston operating fluid conduit.

An advantage of minimising the components that travel with the device is that the greater force that would be needed to pull lengthy components along the conveyance member would require the device to be larger, which in turn would create more heave on the material. Too much heave can in some circumstances be problematic, for example if the conveyance member is near the surface or there are pipes nearby in the material. Too much heave could cause a distortion in the surface, or damage to nearby pipes.

The device preferably includes a valve system for appropriately pressurising the first and second chambers to cause a repetitive percussive action of the piston against the anvil. The valve system preferably causes a first percussive action in a first direction and a lesser or no percussive action in a second direction opposite to the first direction.

In some embodiments, the device can include a selectively configurable valve system having a first configuration and a second configuration and selectively configurable into the first or second configuration, the first configuration being for causing a repetitive percussive action in a first direction, and the second configuration being for causing a repetitive percussion action in a second direction opposite to the first direction.

This allows for forward and backward movement, each with a hammer action.

In the first configuration, there is generally a lesser or no percussive action in the second direction and in the second configuration there is generally a lesser or no percussive action in the first direction.

In some embodiments, the device can include a material loosener operable to loosen material ahead of the displacement element as the device is advanced along a conveyance member.

The material loosener can be arranged substantially evenly around the longitudinal axis to provide substantially even loosening of material around a conveyance member. The material loosener can be provided in, on, or as part of the displacement element.

The material loosener can be operable to create a suspension, hydrate and/or break up the material. For example, the material loosener can include a spray for spraying loosening fluid ahead of the displacement element. This can make the material create a suspension and thereby loosen the material, allowing it to be displaced by the displacement element. The loosening fluid is preferably a liquid, and preferably a lubricating liquid. The most preferred example of liquid to be used is bentonite solution. Bentonite solution is known in the drilling industry. It is a natural clay mixed with water which can cause earth and rock to float. This is advantageous since it can stabilise the void created by the displacement element, cool the device, and lubricate the displacement element. It is possible to use other fluids. For example, emulsion slurry can be used. However, this is not preferred since it is not biodegradable. Water can also be used. The use of a fluid can compact the surrounding material.

The material loosener can include a fluid distribution network including:

an inlet for receiving loosening fluid from a loosening fluid supply; and a plurality of forward-facing outlets for emitting loosening fluid into material ahead of the displacement element, the plurality of outlets being coupled to the inlet by one or more conduits.

The inlet can be coupled to a loosening fluid supply via a feed conduit.

The fluid distribution network can include a first distribution conduit for transporting loosening fluid in a first angular direction around the longitudinal axis and a second fluid distribution conduit for transporting loosening fluid in a second angular direction around the longitudinal axis opposite to the first angular direction. Each of the first and second distribution conduits can include a plurality of evenly spaced outlets. The first and second distribution conduits can be on or in the displacement element. The fluid distribution network can be housed within a housing for protection with openings for the outlets and inlet to emit and receive loosening fluid, respectively. Part or all of the housing can be provided by the displacement element. The outlets can be configured to emit fluid through openings in the displacement element.

The material loosener can include a drilling element. The drilling element can include any features to assist drilling, such as teeth.

In some embodiments, the drilling element can be provided at or on the front of the displacement element. However, in other embodiments, the drilling element can be an annular element distinct from the displacement element. If the drilling element is a distinct annular element, it preferably has a greater diameter than the displacement element since the displacement element is designed to push out loosened material.

In some embodiments, the material loosener can be fixedly coupled to or integral with the displacement element so that the device advances as a single unit.

According to an aspect of the invention, there is provided a system for removing a conveyance member from a material, including:
 a device as described above; and
 a piston operating fluid supply for supplying piston operating fluid to the device.

Preferably, the piston operating fluid supply includes a fluid conduit coupled to the driving element of the device to supply preferably pressurised piston operating fluid to the piston chamber, preferably by being received in the fluid conduit coupling element.

In some embodiments, the system is configured so that the only component attached to the device, which is configured to travel with the device, and which is configured not to entirely enter material, is the pressurised piston operating fluid conduit.

Some embodiments include a loosening fluid supply operable to supply a loosening fluid, preferably under pressure, to the spray of the device. The fluid can be supplied for example using a feed conduit.

According to an aspect of the invention, there is provided a device for securing a conveyance member mover to a conveyance member, including:
 an annular clamp for being received around a conveyance member, an internal diameter of a first end of the annular clamp being greater than an external diameter of a conveyance member to be moved;
 a coupling element for coupling the annular clamp to a conveyance member mover; and
 at least one block for being pressed between the clamp and a conveyance member;
 wherein the at least one block and/or the annular clamp includes a taper whereby a force on the clamp causes the clamp to press the block against the conveyance member.

Preferably, the annular clamp has a taper and an internal diameter of a second end of the clamp is less than the internal diameter of the first end of the clamp.

Preferably, the block is a wedge.

Preferably, a surface, preferably a tapered surface, of the wedge includes a gripping finish, for example a roughened finish, to increase friction with the annular clamp.

According to an aspect of the invention, there is provided a method of moving a conveyance member including:
 placing an annular clamp over a conveyance member, wherein an internal diameter of a first end of the annular clamp is greater than an external diameter of a conveyance member to be moved;
 placing at least one block between the clamp and the conveyance member; and
 applying a force to the clamp in a direction in which the first end of the clamp is facing, to move the conveyance member;
 wherein the at least one block and/or the annular clamp includes a taper whereby the force on the clamp causes the clamp to press the block against the conveyance member.

Preferably, the force on the conveyance member is longitudinal.

Preferably, the force is applied by a horizontal directional drilling unit, for example by coupling a horizontal directional drilling unit to the clamp.

Preferably, the or each block is a wedge and the or each block is placed between the clamp and the conveyance member with a thicker end of a taper of the wedge facing the direction in which the force is applied.

According to an aspect of the invention, there is provided a method of removing a conveyance member from a material, the method including:
 placing a device as described above on the conveyance member at or near a first end thereof;
 advancing the device towards a second end of the conveyance member to loosen the conveyance member between the first and second ends; and
 applying a substantially longitudinal force to the conveyance member to draw the conveyance member out of the material.

According to an aspect of the invention, there is provided a method of removing a conveyance member from a material, the method including:
 placing a device including a displacement element for displacing material on the conveyance member at or near a first end thereof;
 operating the device to perform a self-propelling action whereby to advance itself towards a second end of the conveyance member, loosening the conveyance member; and
 applying a substantially longitudinal force to the conveyance member to draw the conveyance member out of the material.

According to an aspect of the invention, there is provided a method of removing a conveyance member from a material, the method including:
 placing a device including a displacement element for displacing material on the conveyance member at or near a first end thereof;

operating the device to perform a percussive driving action whereby to advance itself towards a second end of the conveyance member, loosening the conveyance member; and applying a substantially longitudinal force to the conveyance member to draw the conveyance member out of the material.

Preferably, the device loosens the conveyance member such that the conveyance member is surrounded directly by loosened material and/or a void, wherein the void directly separates the material from the conveyance member. In other words, there is only loosened material or a void between the conveyance member and the material from which the conveyance member is to be removed. Specifically, the device avoids pulling a duct over the conveyance member. This is because the greater force that would be needed to pull a duct over the conveyance member would require the device to be larger, which in turn would create more heave on the material. Too much heave can in some circumstances be problematic, for example if the conveyance member is near the surface or there are pipes nearby in the material. Too much heave could cause a distortion in the surface, or damage to nearby pipes.

Operating the device can include supplying preferably pressurised piston operating fluid to the device to cause the percussive driving action.

Preferably, the device entirely enters the material as it loosens the conveyance member.

In some embodiments, as the device loosens the conveyance member, the device is coupled to a pressurised piston operating fluid conduit for providing pressurised piston operating fluid to the device, and the pressurised piston operating fluid conduit is the only component attached to the device, which travels with the device, and which does not entirely enter the material.

Advancing the device can include applying loosening fluid under pressure to the spray of the device, for example to the fluid distribution network, to cause the device to spray and thereby loosen material ahead of it.

The method can include excavating material around the first end to allow the device to be placed onto the conveyance member and to allow a conveyance member mover to be attached to the conveyance member to apply the longitudinal force.

The method can include excavating material around the second end.

The method can include excavating material around a first and/or a second section of conveyance member and cutting the conveyance member in that or those section(s) to form the first and/or second end.

Preferably, if a conveyance member is cut to form an end, the method also includes capping the conveyance member, preferably using the method for capping a conveyance member described below.

Preferably, after the conveyance member is removed, the method includes pumping a filling material into a void left by the conveyance member.

The method can include inserting a duct into a void left by the conveyance member to keep the void open for possible reuse. This can be done by attaching a duct to the second end of the conveyance member before the conveyance member is withdrawn so that the conveyance member draws the duct into the void as it is being withdrawn.

According to an aspect of the invention, there is provided a method of capping a conveyance member, including:

placing a cap over an end of a conveyance member; and coupling the cap to the conveyance member by a mechanical coupling only.

The preferred method of securing a cap to a conveyance member avoids the need to have the cap soldered to the conveyance member. This avoids the time and expense of having an expert jointer soldering the conveyance member.

Although the preferred method of capping a conveyance member may allow some moisture into the conveyance member, this is not a problem where the conveyance member is not intended to be reused since the reason for excluding moisture is that it may provide a path to ground for electricity in a live wire. The inventors have discovered that a cap coupled by purely mechanical means is sufficient to prevent egress of oil, which is all that is necessary in redundant oil filled conveyance members.

BRIEF DESCRIPTION OF THE DRAWINGS

Preferred embodiments of the invention are described below, by way of example only, with reference to the accompanying drawings, in which:

FIG. 1a is a schematic cross-sectional diagram of a device according to an embodiment of the invention;

FIG. 1b is a perspective view of the device of FIG. 1a;

FIGS. 2 to 9 are views of embodiments of the invention;

DESCRIPTION OF THE PREFERRED EMBODIMENTS

Figure 3:
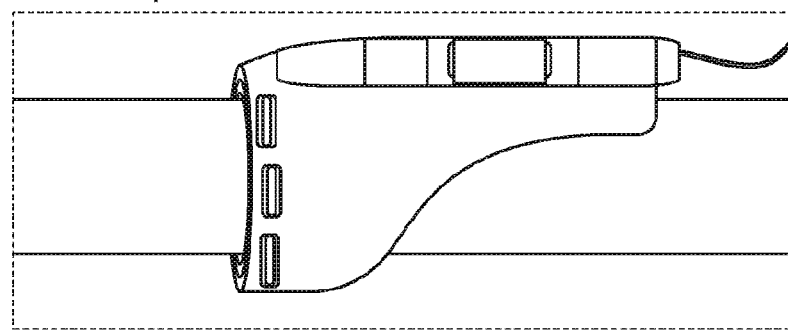
Figure 4:
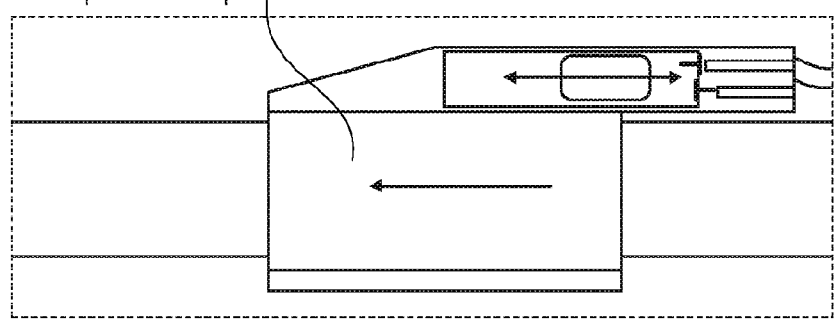

As described above, electrical cables are often buried in the ground. There is a variety of materials which can be around the cable underground, such as earth, soil, sand, cement, cement bound sand (CBS). Embodiments described below are generally described for a cable surrounded by earth. However, the description is equally applicable to a cable surrounded by other materials.

As can be seen from FIG. 1a, a device 10 according to an embodiment of the invention includes a displacement element 12.

The displacement element is an annular element typically made from cast steel arranged so that it includes an inner passageway for receiving a cable 16. As the displacement element is advanced along a cable 16 it displaces earth that was adjacent to the cable 16, compacting the earth outside the outer perimeter of the displacement element 12. The displacement element 12 and therefore the device 10 can be considered to have a longitudinal axis which when the device is placed on a cable corresponds to a longitudinal axis of the cable.

A cross section of the displacement element 12 when viewed along the longitudinal axis is substantially circular in order to correspond with the cable 16. In particular, a cross-section of the inner passageway is substantially circular to receive the cable and a cross-section of the outer perimeter is substantially circular for tunneling efficiency.

As can be seen from FIG. 1a, the displacement element 12 includes a cylindrical body section 13 with a first outer diameter, and a tapering nose section 15 which is coupled to and extends from a front end of the body section 13. The nose section 15, while still annular, tapers from the first outer diameter at a junction with the body section 13 to a reduced second outer diameter at a nose tip 17. The nose section serves to progressively displace material as the device is advanced for tunneling efficiency.

An inner diameter of the displacement element, that is the diameter of the inner passageway or inner edge, is substantially constant throughout both the body section and nose section and is slightly greater than the diameter of the cable 16 on which the device is designed to be used.

At the tip 17 of the nose section, the inner and outer diameters of the displacement element are substantially equal.

In the embodiment of FIG. 1a, the outer diameter of the displacement element can be about 140 mm. However, different cables have different diameters, and it is accordingly possible to provide a plurality of devices as described herein, each with a displacement element with an inner diameter of a different size, designed to fit different cables.

The device 10 includes a percussive driving element, in this embodiment within the displacement element 12, in this embodiment in the form of a pneumatic or hydraulic cylinder.

Within the body section 13 of the displacement element 12, between the inner edge and the outer perimeter, is provided a piston chamber 19. The chamber is cylindrical, and as can be seen in FIG. 1a, and can have a longitudinal length substantially corresponding to a longitudinal length of the body section 13. In this embodiment, the piston chamber 19 is fluid-tight for piston operating fluid so that piston operating fluid can be used to pressurise the piston chamber 19.

At a front end of the piston chamber 19 is provided an anvil 21. The anvil 21 is fixed to the displacement element 12 and substantially fills a front portion of the piston chamber 19. The anvil 21 is annular so that it does not occlude the inner passageway within displacement member 12 through which the cable 16 is intended to pass.

The piston chamber 19 also includes an annular piston 23 which is free to slide longitudinally in the piston chamber 19.

The piston 23 substantially occludes the piston chamber 19 so that a pressure difference can be formed across the piston 23. In other words a region of the chamber 19 in front of the piston can be placed at a different pressure from a region of the piston chamber 19 behind the piston 23, thereby causing the piston to be moved longitudinally within the piston chamber.

The anvil 21 and the piston 23 are made of a hard material, preferably metallic, for example high grade impact steel, so that when the piston 23 is driven into the anvil 21 in a percussive manner, there is an efficient transfer of longitudinal force from the piston 23 to the anvil 21 without significant deformation of either component. The piston can have a lubricating treatment such as Teflon.

The driving element includes a fluid conduit coupling element 37 for coupling to a fluid conduit such as a fluid hose 25 to provide piston operating fluid to the piston chamber in order to drive the piston.

In this embodiment, the fluid conduit coupling element 37 is provided at the back end of the piston chamber 19 as shown. However, in other embodiments, the fluid conduit coupling element can be provided at other locations of the device.

A first conduit 27 is provided for routing piston operating fluid from the fluid conduit coupling element 37 to a front end of the piston chamber 19 behind the anvil 21.

A second conduit 28 is provided for routing piston operating fluid from the fluid conduit coupling element 37 to a back end of the piston chamber 19.

The conduits can be made by drilling though the displacement element once it has been cast and then capping off the point(s) at which the drill entered the displacement element in a technique known in the art.

This effectively creates two chambers, a front chamber between the piston 23 and the anvil 21, and a back chamber between the piston 23 and the back end of the piston chamber 19. The sizes of the front and back chambers are variable by movement of piston 23.

The front chamber is pressurised by the first conduit 27, and the back chamber is pressurised by the second conduit 28.

The device is provided with a valve system that is configured to appropriately pressurise the front and back chambers so as to cause the piston to repeatedly impact against the anvil and thereby drive the device forward in a percussive manner. Such a valve system is within the abilities of the skilled person; a valve system such as used in a jackhammer can be used.

In order to cause the device 10 to advance and thereby tunnel through a material around the cable, piston operating fluid under pressure is supplied via the fluid hose 25 and pressurises the back chamber and the front chamber of the driving element under control of the valve system.

The valve system causes a first pressure difference across the piston 23 which causes the piston to be driven forwards towards the anvil 21 until it strikes the anvil 21. The striking of the anvil 21 by the piston 23 transfers longitudinal forward force from the piston 23 to the anvil 21 and thereby to the device 10 as a whole, causing it to advance through the material.

As the piston 23 strikes the anvil 21, the valve system causes a second pressure difference opposite to the first pressure difference across the piston 23, driving the piston 23 in a backwards direction away from the anvil 21.

After the piston has moved backwards a predetermined amount, possibly the entire length of the piston chamber, the valve system applies the first pressure difference again and advances the piston towards the anvil.

The valve system is configured so that if the piston reaches the back end of the piston chamber, the piston does not perform as great a percussive action on its backwards movement as when it strikes the anvil.

The fact that the percussive action of the piston 23 on the back end of the piston chamber is reduced or non-existent means that, significantly more longitudinal force is transferred to the device 10 on the advancing stroke than on the reverse stroke, thereby causing the device 10 as a whole to advance more on advancing strokes than it goes backwards on reverse strokes.

In some embodiments, the valve system is selectively operable to vary which direction achieves the greater percussive action.

In other words, the valve system can selectively cause a greater percussive action on either the anvil or on the back of the piston chamber.

This can mean that the device 10 can be operated in reverse to cause the device to reverse through a tunnel or void that has already been bored.

Although in the embodiments described above, the driving element is incorporated into the displacement element, this is not necessary in all embodiments. FIGS. 2-9 depict other embodiments in which the driving element is not annular.

FIG. 2 depicts a device 1000 including an annular displacement element 1012 and a driving element 1014. As can be seen, the driving element is fixed to the displacement element at one part of the circumference of the displacement element 1012.

The driving element 1014 works in a similar way to the driving element of the embodiment above. However, in this embodiment, the components of the driving element 1014 such as the piston chamber, the piston, and the anvil are not annular; they are solid, as is the case for all of the embodiments of FIGS. 2 to 9.

Indeed, the embodiments of FIGS. 2-9 can be provided by attaching a hydraulic or pneumatic mole, the like of which is known for use for drilling holes in the ground, to an annular displacement element 1012.

Figure 5:
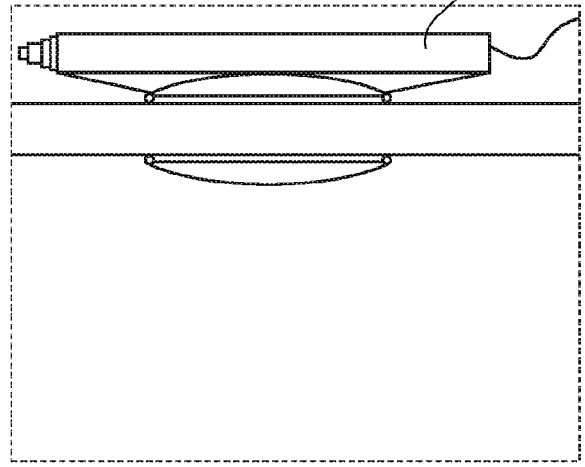
Figure 6:
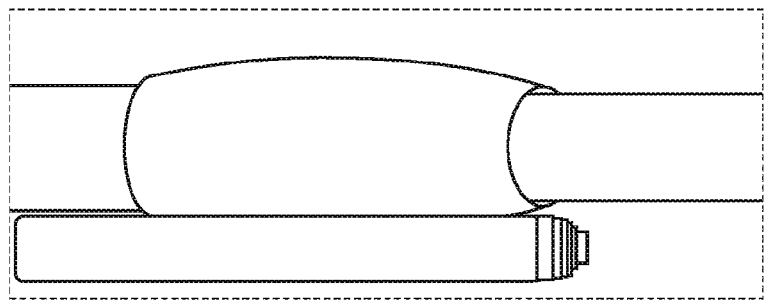
Figure 7:
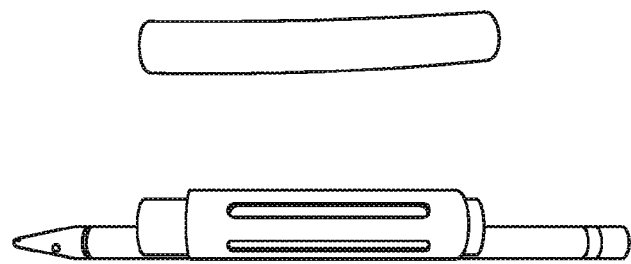
Figure 8:
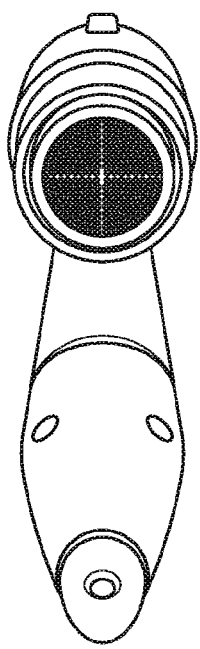
Figure 9:
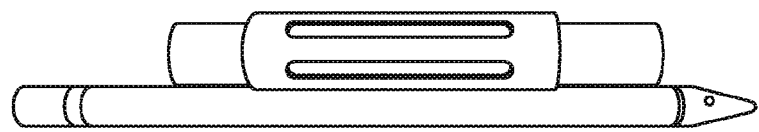

In the embodiment of FIGS. 5 and 6, the driving element 2014 utilises a telescoping hydraulic or pneumatic cylinder in order to provide a longer stroke. Telescoping pneumatic and hydraulic cylinders are within the abilities of one of skill in the art.

In practice, when a device comprising an annular displacement element and a non-annular or solid driving element is used, the driving element will generally travel beneath the displacement element, as shown in FIG. 6.

In some embodiments, such as shown in FIG. 2, the device can include a material loosener. A material loosener can include a fluid distribution network providing a spray. The fluid distribution network includes an inlet 1022 for coupling to and receiving fluid from a feed conduit 1024.

The inlet 1022 includes a conduit inside the displacement element 1012 which leads fluid from the feed conduit to a fluid junction at a top of the front edge of the displacement element 1012. The fluid junction is arranged to divide fluid and includes first and second output conduits. The first output conduit passes inside and around the displacement element 1012 in a clockwise direction adjacent to a front edge of the displacement element 1012. The first output conduit leads fluid around the displacement element 1012 in a clockwise direction. Evenly spaced along the first output conduit are provided apertures 1030 in the output conduit and displacement element 1012 through which fluid in the first output conduit is emitted forwards.

The second output conduit corresponds to the first output conduit except that it passes around the displacement element 1012 in an anti-clockwise direction.

The first and second output conduits terminate adjacent to each other at a point substantially diametrically opposite the junction. However, they are not in fluid communication at this point.

However, in other embodiments, different configurations of the fluid distribution network are possible. Furthermore, it is possible to have a single output conduit which passes all the way around the displacement element 1012 from the junction rather than having two output conduits passing in opposing directions. It is also possible for each aperture to have its own dedicated output conduit leading from the junction. Additionally, it is not necessary to have the apertures 1030 evenly spaced. However, having two opposing output conduits has been found to be an efficient way to provide a symmetrical pressure of fluid emission from a single feed conduit.

Figure 10:
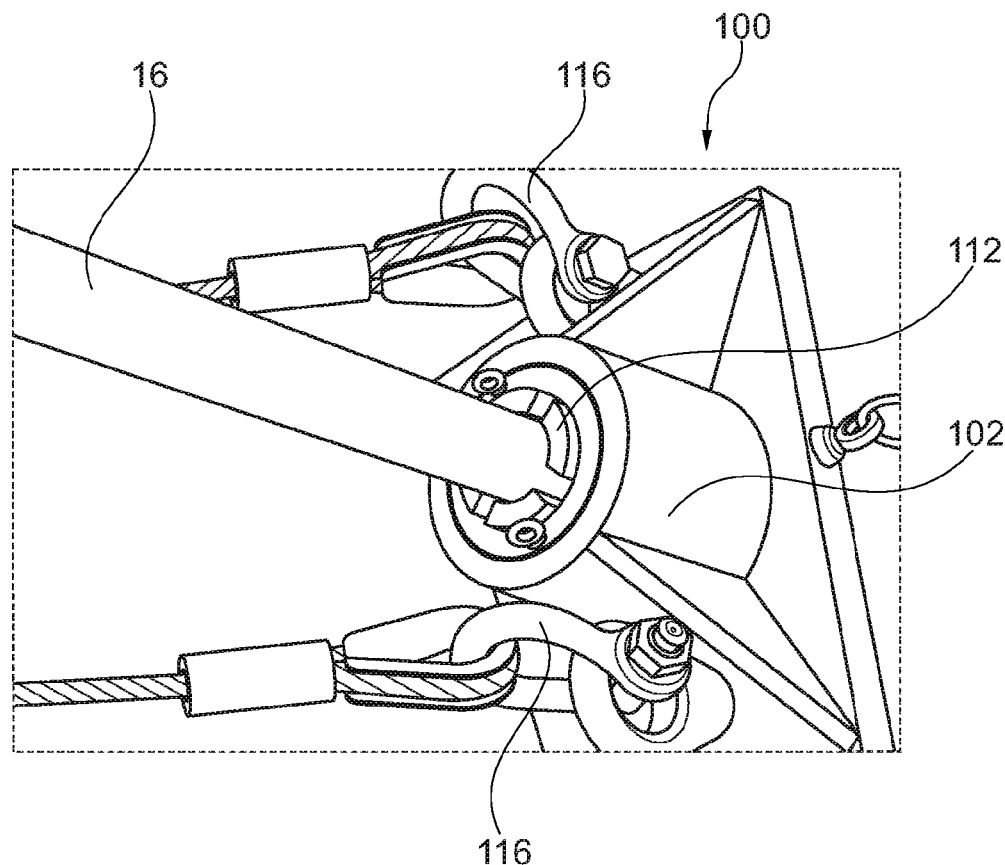
FIG. 10 is a perspective view of a device according to an embodiment of the invention.

FIG. 10 shows a device 100 for securing a cable puller to a cable 16. The device 100 includes an annular clamp 102 which can be received on a cable 16.

Figures 10A, 10B:
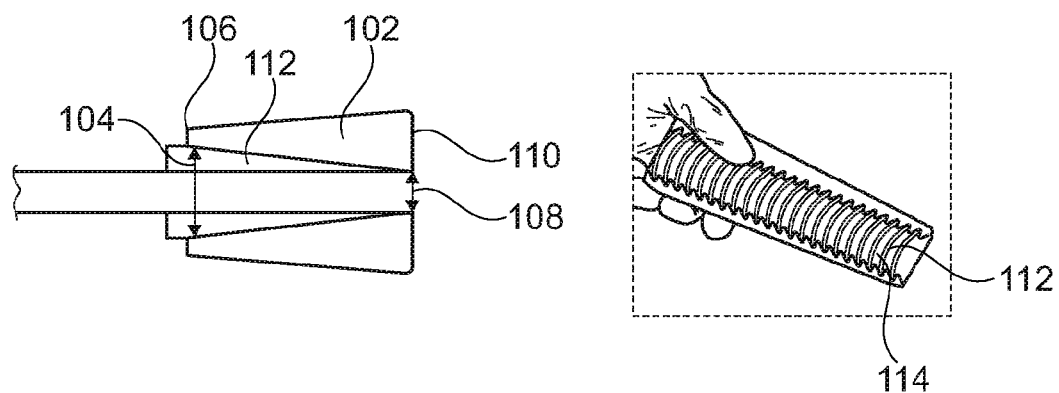
FIG. 10A is a perspective view of a wedge for use in the device of FIG. 10.
FIG. 10B is a schematic cross section of the device of FIG. 10.

As can be seen more clearly in FIG. 10B, the annular clamp includes a first internal diameter 104 at a first end 106 and a second internal diameter 108 at a second end 110. The internal diameter is the diameter of the cross section viewed along a longitudinal direction inside the clamp, in other words the space through which a cable can pass.

The first internal diameter 104 is greater than the second internal diameter 108 and the internal surface of the annular clamp tapers from the first end to the second end.

The device includes a plurality of removable wedges 112. The wedges are blocks with a tapering surface 114. The taper of the tapering surface 114 corresponds to the taper of the annular clamp so that the wedges 112 can fit between the internal surface of the annular clamp and the cable while being in substantially full contact with both.

The tapered surface 114 of the wedges 112 is provided with a roughened gripping finish to increase friction with the clamp.

As can be seen from FIG. 10, in this embodiment there are four wedges 112 for being placed between the clamp and a cable. However, there can be more or fewer than four in other embodiments.

The device 100 includes a plurality of coupling elements 116 attached to the clamp for coupling to a cable puller. As shown, these can be in the form of loops. They are preferably located symmetrically about the annular clamp in order to provide a substantially longitudinal force to the device 100. In the embodiment of FIG. 2, the coupling elements 116 are located in a line with the clamp, with one either side of the clamp.

The devices described above can be used in a method of removing a cable as follows.

Figure 11A:
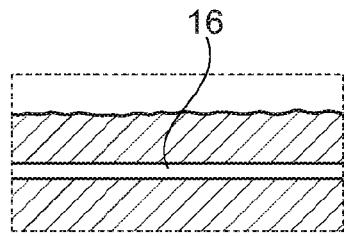
FIG. 11A is a schematic cross section of an area of ground in which a cable is located.

As shown in FIG. 11A, an area of ground is located in which a cable 16 passes under the ground.

Figure 11B:
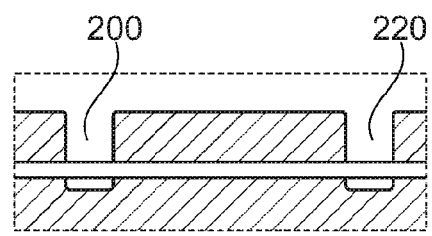
FIGS. 11B to 11H are schematic cross sections of the area or a part of the area of ground of FIG. 11A during operation of a method according to an embodiment of the invention.

As shown in FIG. 11B, a first excavation is made to excavate a launch site 200 exposing a first section of the cable 16, and a second excavation is made to excavate a receive site 220 exposing a second section of the cable 16.

Figure 11C:
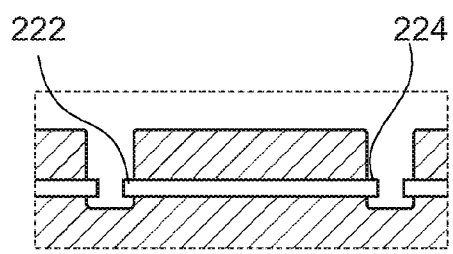

As shown in FIG. 11C, the first and second sections of cable are cut to create a section of cable to be removed with a first end 222 and a second end 224.

Figure 11D:
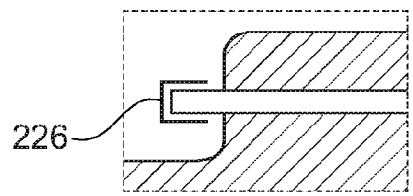
Figure 11E:
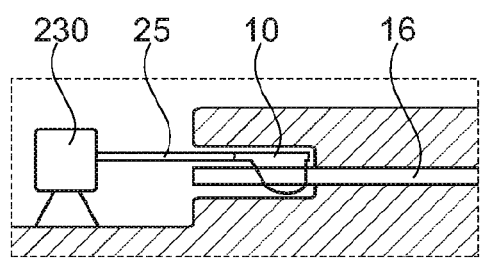

As shown in FIG. 11D, each of the exposed ends of cable have a cap secured to them by purely mechanical means. The caps 226 are generally available for sale as caps for gas or water pipes. Previously, it has generally been considered necessary to solder copper caps to the ends of oil filled electric cables to keep out moisture. However, this is expensive. While soldering copper caps can still be done if the cable is to be reused, for redundant cables, it is advantageous to secure a cap by purely mechanical means.

The next stage is to loosen the cable 16 for the section that is to be removed.

An air hose 25 is coupled between a device such as the device 10 as described above and a piston operating fluid supply such as a pneumatic or hydraulic supply 230.

The device 10 is placed over the first end 222 of the cable 16 so that the cable passes through the annulus of the displacement element 12.

The fluid supply 230 is operated to supply pressurised piston operating fluid through the hose 25.

As described above, the supply of pressurised piston operating fluid to the device 10 causes the driving element of the device 10 to perform a percussive action of the piston repeatedly striking the anvil. This drives the device forward through the material causing the displacement element to push material away from the cable and compact it outside the outer perimeter of the displacement element, creating a void immediately around the cable 16.

As can be seen, in this embodiment, the hose 25 is the only component attached to the device 10, which travels with the device 10, and which does not entirely enter the material.

If needed during the advancing of the device, in some embodiments it is possible to operate the device in reverse, as described above, for example to loosen the device if it has become stuck, or to retract the device is there is an obstacle such as an old repair joint.

Once the device 10 has emerged in the receive pit 220, the device 10 is decoupled from the hose 25 and removed or reversed to the launch pit.

Figure 11F:
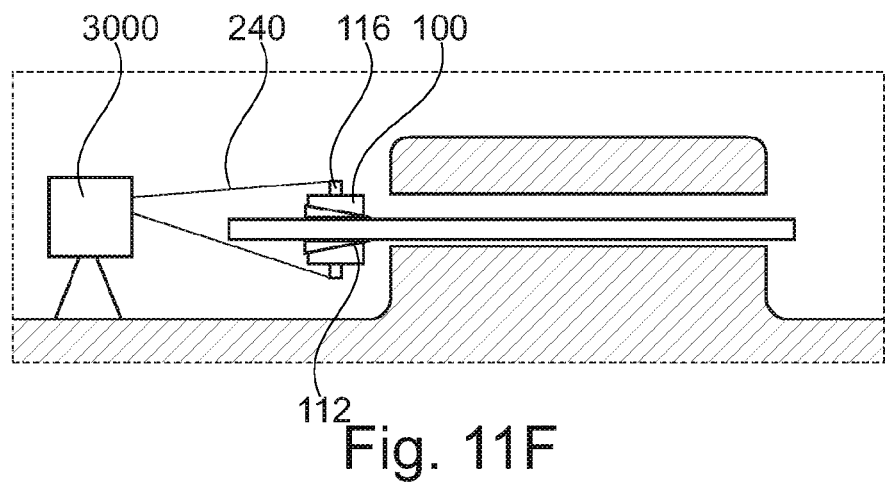

A device 100 as described above is attached to the cable 16 near the first end 222 as shown in FIG. 11F.

The device 100 is placed over the first end of the cable and advanced over the cable so that the first end 106 of the device 100 faces the direction in which the cable is to be withdrawn.

The wedges are then placed between the internal surface of the clamp 102 and the cable 16, and the coupling elements 116 are coupled to a cable remover 3000, for example by cables 240. The cable remover 3000 can be a horizontal directional drilling unit.

The cable remover 3000 is then operated to apply a longitudinal force to the device 100 in the direction from the second end 110 of the device 100 towards the first end 106.

The grip of the device 100 on the cable 16 causes this longitudinal force to be transferred to the cable and to draw the cable out of the material towards the cable remover 3000.

As the clamp 102 is pulled by the cable remover, the cooperation of the tapers of the wedges and the internal surface of the clamp causes the clamp to press the wedges tighter against the cable, thereby increasing the grip of the device on the cable. This minimises the ability of the clamp to slide along the cable.

Owing to the looseness of the cable and/or to the void created by the device, the cable 16 slides out of the material in response to being pulled by the device 100.

The earth may slowly spring back after the removal of the conveyance member to its arrangement before use of the device. In other words, the device can compact the earth around its outer perimeter, but over time, the earth will regain its original arrangement once the device has moved away.

In some embodiments, it is possible to attach a duct to the second end of the cable 16 so that as the cable is removed, it draws the duct in to replace the cable, thereby keeping the void open for possible future reuse.

Figure 11G:
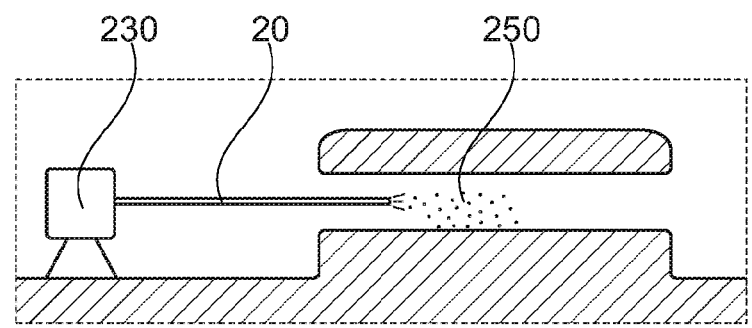

In the depicted embodiment, once the cable has been removed and replaced with a duct 20, the duct 20 is coupled to the cable remover 3000 and the cable remover is operated to retract the duct 20 while spraying a grout 250 into the void left by the cable as shown in FIG. 11G.

Figure 11H:
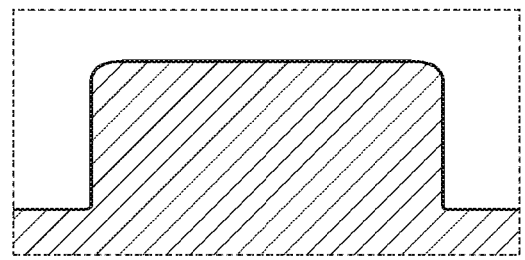

After about 6 hours, the grout will have set, thereby securely filling the void as shown in FIG. 11H.

The method described herein can provide an inexpensive and rapid way to remove underground cables, with minimal disruption to the surface. Preferred methods can remove a 150 m section of cable, which would normally take about 2 weeks to remove, in about 90 minutes.

In embodiments which include a material loosener, during tunnelling, the fluid supply 230 can also supply loosening fluid, such as water or bentonite solution, through a loosening fluid feed which is coupled to the appropriate loosening fluid inlet, such as the inlet 1022 in the example of FIG. 2.

The loosening fluid enters the inlet 1022 of the device and is distributed by the junction to the first and second conduits. Owing to the pressure of the loosening fluid, the loosening fluid sprays out of the apertures 1030 in a forward direction with respect to the device.

As the device is advanced into the material, the loosening fluid is being sprayed in front of the device, causing the material to become a loose suspension. As the displacement element is advanced into this loose suspension of material, it easily pushes it away from the cable 16 and compacts it outside the outer perimeter of the displacement element. This creates a void immediately around the cable.

In addition to the above, various modifications can be made and different embodiments are possible.

Although the displacement element is generally described as being annular, it is not necessary in all embodiments for the displacement element to be continuous around the cable. However, it is preferred that the displacement element is configured to displace material from the entire periphery of the cable. It is also not necessary that the displacement element is circular in cross section when viewed along the longitudinal axis. However, it is preferred that the cross section when viewed along the longitudinal axis substantially corresponds to the cross section of the cable 16 when viewed along the longitudinal axis as this tends to maximise the material displacement efficiency of the displacement element.

It is also not necessary for the body section of the displacement element to be completely cylindrical. The inner and/or outer diameter can vary along its length and/or it does not need to completely enclose a cable along its whole length. Examples of possible shapes are shown in FIGS. 2 to 6.

Although the preferred embodiments use hydraulic or pneumatic percussive action, some embodiments can use an electric or other motor to provide percussive or other self-propelling action for example a hollow DC electric motor. It is to be appreciated that not all embodiments require a fluid conduit such as air hose 25 to be coupled to the device, for example if they do not use compressed fluid.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in British patent application number 1422723.5, from which this application claims priority, and in the abstract accompanying this application are incorporated herein by reference.

The invention claimed is:

1. A method for removing a conveyance member from a material using a removal device having:
   I. a displacement element configured to fit at least partially about a circumference of the conveyance member;
   II. a driving element coupled to the displacement element, the driving element having a piston chamber with a piston therein, wherein motion of the piston within the piston chamber moves the displacement element along the conveyance member; and III. a fluid conduit connected to the driving element, the fluid conduit:
   A. being configured to convey piston-moving fluid to the driving element, and
   B. extending from a location spaced away from the displacement element, the method including the steps of:
a. fitting the displacement element at least partially about a circumference of a conveyance member situated within the material, the displacement element being fit at or near a first end of the conveyance member;
b. moving the piston within the piston chamber, thereby moving the displacement element in a first direction along the conveyance member and through the material, wherein:
   (1) the fluid conduit is moved by the removal device to trail the driving element during motion of the displacement element through the material, and
   (2) no component other than the fluid conduit is moved by the removal device to trail the removal device during motion of the displacement element through the material.

2. The method of claim 1 further including the step of applying a force to the conveyance member to draw the conveyance member out of the material.

3. The method of claim 2 wherein the force is applied by a horizontal directional drilling unit.

4. The method of claim 2 followed by the step of moving the piston within the piston chamber to move the displacement element in an opposite second direction along the conveyance member and through the material.

5. The method of claim 1 wherein the piston chamber is annular.

6. The method of claim 1 wherein the driving element includes:
   a. a first fluid conduit at or adjacent a first end of the piston chamber, and
   b. a second fluid conduit at or adjacent a second end of the piston chamber,
   whereby supply of fluid to one of the conduits, and removal of fluid from the other of the conduits, drives the piston between the first and second ends of the piston chamber.

7. The method of claim 1 wherein the piston is configured to percussively impact at least one end of the piston chamber, wherein such percussive impact moves the displacement element along the conveyance member.

8. The method of claim 1 wherein the displacement element has a length along which a passageway is defined, the passageway being configured to receive the conveyance member.

9. The method of claim 8 wherein:
   a. the piston is defined by an annular member, and
   b. the passageway extends within the annulus.

10. The method of claim 8 wherein the passageway has a diameter of at least 80 mm.

11. The method of claim 1 wherein the driving element is provided within the displacement element.

12. The method of claim 1 wherein the piston is pneumatically driven.

13. The method of claim 1 wherein both the driving element and displacement element extend continuously about a passageway configured to receive the conveyance member.

* * * * *